United States Patent [19]

Dahm et al.

[11] Patent Number: 4,517,141
[45] Date of Patent: May 14, 1985

[54] PRODUCTION OF MICROCAPSULES HAVING WALLS OF POLYADDITION PRODUCTS OF WATER-INSOLUBLE POLYAMINES WITH WATER-SOLUBLE POLYISOCYANATE ADDUCTS

[75] Inventors: Manfred Dahm; Norbert Weimann; Ulrich Nehen, all of Leverkusen; Hanns P. Müller, Odenthal-Blecher; Gert Jabs; Albert Awater, both of Odenthal; James M. Barnes, Wermelskirchen, all of Fed. Rep. of Germany

[73] Assignee: Bayer Aktiengesellschaft, Leverkusen, Fed. Rep. of Germany

[21] Appl. No.: 506,451

[22] Filed: Jun. 21, 1983

[30] Foreign Application Priority Data

Jun. 30, 1982 [DE] Fed. Rep. of Germany ....... 3224454
Jun. 30, 1982 [DE] Fed. Rep. of Germany ....... 3224456

[51] Int. Cl.$^3$ ............................................. B01J 13/02
[52] U.S. Cl. .................... 264/4.7; 252/350; 252/609; 346/215; 346/222; 428/402.21; 428/402.24; 430/138; 430/903; 502/8; 521/53
[58] Field of Search ................... 264/4.7; 428/402.21, 428/402.24

[56] References Cited

U.S. PATENT DOCUMENTS

| | | | |
|---|---|---|---|
| 3,577,515 | 5/1971 | Vandegaer | 264/4.7 X |
| 3,723,372 | 3/1973 | Wakimoto et al. | 524/317 X |
| 3,725,501 | 4/1973 | Hilbelink et al. | 428/402.24 X |
| 4,076,774 | 2/1978 | Short | 264/4.7 X |

FOREIGN PATENT DOCUMENTS

| | | | |
|---|---|---|---|
| 0023613 | 2/1981 | European Pat. Off. | 428/402.21 |
| 1103202 | 2/1968 | United Kingdom | 427/214 |

*Primary Examiner*—Richard D. Lovering
*Attorney, Agent, or Firm*—Connolly and Hutz

[57] ABSTRACT

Microcapsules having a hydrophobic core material and capsule walls formed by the reaction of water-insoluble polyamines with water-soluble bisulphite adducts of polyisocyanates, a process for the production thereof which is characterized in that a mixture of a hydrophobic core material and water-insoluble polyamines is emulsified in water or in an aqueous protective colloid solution to the required particle size, water-soluble bisulphite adducts of polyisocyanates in the form of powders or aqueous solutions are added and the mixture is left to react to completion at temperatures of from 1° to 140° C., and applications thereof.

4 Claims, No Drawings

PRODUCTION OF MICROCAPSULES HAVING WALLS OF POLYADDITION PRODUCTS OF WATER-INSOLUBLE POLYAMINES WITH WATER-SOLUBLE POLYISOCYANATE ADDUCTS

Microcapsules have been produced by dispersing in water solutions of substances to be encapsulated (core material) and polyisocyanates in hydrophobic solvents, adding to the continuous aqueous phase a polyamine which is soluble therein and producing a polyurea at the interface of the dispersed droplets of polyisocyanate and polyamine. This method of microencapsulation by interfacial polyaddition may only be applied if the core material is inert towards polyisocyanates and if a water-soluble polyamine may be used. It cannot be used for encapsulating substances which react with polyisocyanates, for example polyamines themselves. Water-insoluble polyamines are also unsuitable for this method.

The present invention relates to microcapsules having a hydrophobic core and capsule walls formed by the reaction of water-soluble polyisocyanate adducts with water-insoluble polyamines. The present invention also relates to a process for producing microcapsules which is characterised in that a mixture of a hydrophobic core material and water-insoluble polyamines in water or an aqueous protective colloid solution is emulsified to the required particle size, water-soluble bisulphite adducts of polyisocyanates are added in the form of powders or aqueous solutions and the mixture is left to react to completion at temperatures of from 1° to 140° C. The core material according to the present invention may consist of the wall-forming polyamine alone or may additionally contain a solvent or an active substance or both. If the core material contains only polyamine, only part of the polyamine is used for forming the wall of the capsule so that the capsule also contains polyamine. If the core material contains solvent and/or active substance in addition to polyamine, the polyamine may be completely used for forming the capsule wall, so that the capsules contain an active substance, a solvent or both. Depending on the contents thereof, the microcapsules may be used, for example, as dye-precursor-containing microcapsules in reaction copying papers, as microcapsules containing flameproofing agents or blowing agents or catalysts in the production of polymers or as solvent-containing microcapsules in the reactivation of adhesives and also as dye- or pigment-containing microcapsules as toners in copying systems and also as active carbon-containing microcapsules for use in absorbing systems of all types.

The diameter of the capsules may be from 0.2 to more than 2000 μm, preferably up to 2000 μm. Where the capsules are used as dye-precursor-containing capsules for reaction copying papers, capsule distributions having median values of from 3 to 10 μm are preferred. Where relatively small capsules are present in the form of agglomerates or clusters, corresponding distributions of the agglomerates with median diameter values of from 3 to 10 μm are preferred.

In the case of encapsulated reaction components or catalysts, the median capsule diameter values are preferably from 3 to 20 μm, because, for example, it is only with diameters distributed over this range that it is possible to obtain sufficiently uniform dispersion of the active substances in the capsules reacting to completion.

For specialised applications, it may even be advantageous to use larger capsules, particularly when the active substances have to be released over large areas or in their entirety by mechanical destruction of the capsule walls, for example during extrusion or mixing under high shear forces or, for example, in the case of dried, reactivatable adhesive layers incorporating microencapsulated solvents which dissolve and reactivate the adhesives by destruction of the capsule walls by the application of pressure. For such systems, capsule diameters of from 100 to 1000 μm are preferred, capsule diameters of from 300 to 500 μm being particularly preferred.

The percentage of the active substance-containing microcapsules constituted by the walls may vary widely. Depending on the application envisaged, higher percentages of the capsules will be constituted by the walls, for example in cases where the capsules are required to be particularly impervious or in cases where mixtures containing microcapsules for the production of mouldings are required to show high storage stability. Alternatively, lower percentages of the capsules will be constituted by the walls in cases where, for example in the event of mechanical destruction of the capsules, the pressure required for the contents of the capsules to be completely released cannot or must not exceed certain levels.

An increase in the stability of the capsules was observed with an increase of from 9 to 50% in the percentage of the capsules constituted by the walls. Although higher percentages of the capsules may in principle be constituted by the walls, this is generally not desirable. The microcapsules according to the present invention are produced by emulsifying a mixture of water-insoluble substances and water-insoluble polyamines in water or, optionally, in an aqueous protective colloid solution to required particle size, adding water-soluble bisulphite adducts of polyisocyanates in the form of powders or aqueous solutions and subsequently carrying out the reaction at temperatures of from 1° to 140° C.

The protective colloid is present in the aqueous phase in small quantities, preferably in a concentration of from 0.01 to 2%, more particularly 0.25% by wt. Additional thickeners acting as stabilisers against sedimentation may optionally be present in the same quantities as the protective colloid. However, it is pointed out in this connection that protective colloids which prevent droplets from recombining during emulsification and the microcapsules formed from agglomerating and thickeners which act as stabilisers against sedimentation cannot be clearly defined in regard to the range within which they act. Protective colloids always develop a certain sedimentation-stabilising effect, while in many cases, thickeners also show a distinct protective colloid effect. Suitable protective colloids are, for example, polyvinyl alcohol, carboxy methyl cellulose and gum arabic. Suitable thickeners are, for example, alginates and xanthans.

The oil phase of the oil-in-water emulsion may amount to from 0.5 to 50%, by weight, preferably from 15 to 45%, by weight, more preferably from 30 to 40%, by weight.

The emulsion is prepared by introducing a mixture of the water-insoluble substance and the polyamine or the polyamine mixture in liquid or molten form with stirring into the optionally heated receiving medium.

If the mixture of water-insoluble substances and polyamine has a melting point above room temperature, the emulsification process may be divided into a forming step, for example by spraying from the melt or by grinding, and a dispersing step in which the finely divided material is dispersed in the aqueous receiving medium. To form the capsule walls, the reacting polyamine has to be heated to its melting point.

Emulsification may be carried out using conventional commercial apparatus, such as laboratory stirrers, propeller stirrers or mixing units operating on the rotor-stator principle, such as mixing sirens. It is not so much the intense shear effect which is important for emulsification as thorough intermixing. It is typical of the amines used in accordance with the present invention that they may be emulsified very easily even in admixture with other water-insoluble substances. In small vessels, vigorous shaking is often sufficient to produce an emulsion (surfactant effect of water-insoluble polyamines).

If the bisulphite adducts of polyisocyanates are to be added in the form of aqueous solutions, the concentration thereof generally amounts to from 0.5 to 80%, by weight, preferably from 10 to 60%, by weight, more preferably from 20 to 45%, by weight.

The oil phase of the emulsion must contain at least that quantity of polyamine which is necessary for encapsulation. Based on the polyamine, bisulphite adduct is added in such a quantity that the required wall component is obtained from the reaction of the polyamine with the masked polyisocyanate, the $NH_2$-groups of the amine being expected to react with the (masked) NCO-groups of the polyisocyanate in a molar ratio of 1:1.

If the polyamine is to react completely, the bisulphite adduct must be used in the corresponding stoichiometric quantity. To accelerate complete reaction of the amine, it is advisable to use the bisulphite adduct in a quantity from 5 to 20% higher than the stoichiometric quantity.

If a portion of the polyamine is to remain in the capsule core, correspondingly less bisulphite adduct should be used taking into account the required percentage wall component.

Preferred percentage wall components are from 5 to 64%, by weight, preferably from 8 to 40%, by weight, more preferably from 10 to 12%, by weight. The reaction of the components for forming the walls of the capsules takes place at temperatures of from 1° to 140° C.

In the case of bisulphite adducts of aromatic polyisocyanates, temperatures of from 1° to 100° C. are preferred, temperatures from 20° to 40° C. being particularly preferred.

In the case of bisulphite adducts of aliphatic polyisocyanates, temperatures of from 50° to 140° C. are preferred, temperatures from 70° to 98° C. being particularly preferred.

Increasingly more rapid, spontaneous (in the absence of amine) resplitting of the bisulphite adducts takes place with increasing temperature. If solutions of bisulphite adducts are heated before mixing with the polyamine emulsion, the solution should only be at elevated temperatures for a limited period. The times and temperatures during and at which approximately 5% of two bisulphite adducts are resplit are shown in Table I.

TABLE I

| T | Adduct according to Example 2 | Adduct according to Example 12 |
| --- | --- | --- |
| 20° C. | unlimited | 2 hours |
| 50° C. | 50 hours | 30 minutes |
| 80° C. | 10 hours | 8 minutes |
| 100° C. | 120 minutes | 1 minute |
| 120° C. | 30 minutes | 10 seconds |
| 130° C. | 8 minutes | — |
| 140° C. | 2 minutes | — |

The polyamines used for forming the capsule walls are insoluble in water. In the context of the present invention, water-insoluble polyamines are to be understood to be polyamines of which less than 2%, preferably less than 1%, dissolves in the aqueous phase. Polyamines are to be understood to be amines which contain at least two primary amino groups. Polyamines having melting points above room temperature are dissolved, optionally at elevated temperature, or heated to a common melting point in the water-insoluble substance to be encapsulated. Emulsification should take place in heated water above the common dissolving or melting temperature, optionally under excess pressure if the dissolving or melting temperature is in the vicinity of or above the boiling temperature of the water.

Diamines are preferably used as the polyamine.

Aliphatic diamines suitable for use in accordance with the present invention are, for example, 1,11-undecamethylene diamine, 1,12-dodecamethylene diamine and also mixtures and isomers thereof, perhydro-2,4′- and -4,4′-diaminodiphenyl methane, p-xylylene diamine, diaminoperhydro-anthracenes (DE-OS No. 2,638,731). It is also possible in accordance with the present invention to use acid dihydrazides, for example oxalic acid dihydrazide, the dihydrazides of malonic acid, succinic acid, glutaric acid, adipic acid, β-methyl adipic acid, sebacic acid and terephthalic acid.

Examples of aromatic diamines are the bisanthranilic acid esters according to DE-OS Nos. 2,040,644 and 2,160,590, the 3,5- and 2,4-diaminobenzoic acid esters according to DE-OS No. 2,025,900, the diamines containing ester groups described in DE-OS Nos. 1,803,635 (U.S. Pat. Nos. 3,681,290 and 3,736,350), 2,040,650 and 2,160,589, the diamines containing ether groups according to DE-OS Nos. 1,770,525 and 1,809,172 (U.S. Pat. Nos. 3,654,364 and 3,736,295), 2-halogen-1,3-phenylene diamines optionally substituted in the 5-position (DE-OS Nos. 2,001,772; 2,025,896 and 2,065,869), 3,3′-dichloro-4,4′-diaminodiphenyl-methane, 4,4′-diaminodiphenyl-methane, 4,4′-diaminodiphenyl-disulphides (DE-OS No. 2,404,976), diaminodiphenyl dithioethers (DE-OS No. 2,509,404), aromatic diamines substituted by alkylthio groups (DE-OS No. 2,638,760) and the water-insoluble high-melting diamines mentioned in DE-OS No. 2,635,400. Ethylene glycol-bis-(p-aminobenzoic acid ester), 2,2′-diaminoazobenzene, 3,3′-diaminoazobenzene, 4,4′-diaminoazobenzene, 2,3-diaminobenzoic acid, 2,5-diaminobenzoic acid, 2,2′-diaminobenzophenone, 4,4′-diaminobenzophenone, 4,4′-diaminostilbene, 2,2′-diaminostilbene, 4,4′-diaminotriphenylmethane, 1,5-naphthylene diamine, 2,6-naphthylene diamine, 2,7-naphthylene diamine, 1,2-diaminoanthraquinone, 1,5-diaminoanthraquinone, 1,4-diaminoanthraquinone, 2,6-diaminoanthraquinone, 3,6-diaminoacridine, 4,5-diaminoacenaphthene, 4,4′-diaminodiphenyl ether, 3,3′-diaminodiphenyl sulphone, 3,3′-dimethoxy-benzidine, 4,4′-diaminodiphenyl sulphone, 2,3-diaminofluorine, 2,5-diaminofluorine, 2,7- diaminofluorine, 9,10-diaminophenanthrene, 3,6-diaminodurol, p-xylylene-bis-(o-aminothiophenyl) ether, 4,3'-diamino-4'-chlorobenzanilide, 4,2'-diamino-4'-chlorobenzanilide, 4-chloro-3,5-diaminobenzoic acid ethyl ester, 4-chloro-3-aminobenzoic acid-(4-chloro-3-aminophenyl ester), 4-chloro-3-aminobenzoic acid-(3-chloro-4-aminophenyl ester), 4-aminobenzoic acid-(3-chloro-4-aminophenyl ester), succinic acid di-(3-chloro-4-amino)-phenyl ester, ethylene glycol-bis-(4-chloro-3-amino)-benzoic acid ester, 3,3'-dichloro-4,4'-diaminodiphenyl carbonate, 4,4'-dichloro-3,3'-diaminodiphenyl carbonate, 4-methyl-3,5-diaminobenzoic acid ethyl ester, 3,5-diaminobenzoic acid methyl ester and 4,4'-diaminodiphenyl-methane-3,3'-dicarboxylic acid dimethyl ester.

Examples of aliphatic-aromatic diamines are the aminoalkyl thioanilines according to DE-OS No. 2,734,574.

The following are additional diamines which are particularly preferred for the purposes of the present invention:

Aliphatic diamines trans, trans-4,4'-diaminodicyclohexyl-methane; diaminomethylated cyclododecane; bis-(6-amino-n-hexyl carbamic acid)-dipropylene glycol diester.

Aromatic diamines diethyl tolylene diamine; 3,5-diethyl-3',5'-diisopropyl-4,4'-diaminodiphenyl-methane; 3,3',5,5'-tetraisopropyl-4,4'-diaminodiphenyl-methane; 3,3',5,5'-tetraethyl-4,4'-diaminodiphyenyl-methane and mixtures thereof; diphenylmethane-3,3'-dithiomethyl-4,4'-diamine; 3,3'-carboxyethyl-4,4'-diaminodiphenyl-methane; dichlorinated 1,3-phenylene diamines; triisopropylated 1,3-phenylene diamine; 3,5-diamino-4-chlorobenzoic acid isobutyl ester; 3.5-diamino-4-methyl-benzoic acid isobutyl ester; bis-(4-aminobenzoic acid)-1,3-propane diol diester; bis-(4-aminobenzoic acid)-1,3-(2-ethyl)-propane diol diester; and naphtylene-1,5-diamine.)

The core materials used in addition to polyamines are also water-insoluble and show the insolubility in water mentioned above in respect of the polyamines. The core materials to be encapsulated must be inert towards primary amino groups. The wall-forming polyamine must be miscible with the core material where it is in the form of a liquid or melt. The polyamine may itself form part of the capsule interior together with other core materials. Furthermore, finely disperse solids may be present in dispersion in the capsule core.

The following water-insoluble substances may be used: various water-miscible solvents which dissolve dye-precursors suitable for copying papers. Examples are chlorinated diphenyls, dodecyl benzene, mixtures of partially hydrogenated and non-hydrogenated terphenylene, isopropyl diphenyl, diisopropyl benzene, benzoic acid ethyl esters, mixtures of diphenyl and diphenyl ethers, phthalic acid dibutyl ester, aralkyl or diaryl ethers, xylenes or conventional commercial mixtures of aromatics of the type accumulating in the aromatisation plants of the petrochemical and petroleum industries; also chlorinated paraffins, cottonseed oil, peanut oil, silicone oil, tricresyl phosphate, monochlorobenzene, alkylated diphenyls, alkylated naphthalenes and relatively highly alkylated benzenes.

In many cases diluents, such as kerosene, n-paraffins and isoparaffins, are added to the solvents. The diluents may be encapsulated both separately and also in admixture with the above-mentioned solvents.

Solutions of dye precursors in the above-mentioned solvents, so-called colour-forming solutions, may advantageously be encapsulated by the processes mentioned above.

Examples of dye-precursors are triphenyl methane compounds, diphenyl methane compounds, xanthene compounds, thiazine compounds and spiropyran compounds.

Particularly suitable dye-precursors are triphenyl methane compounds: 3,3-bis-(p-dimethylaminophenyl)-6-dimethylaminophthalide and 3,3-bis-(p-dimethylaminophenyl)-phthalide ("malachite green lactone"); diphenyl methane compounds: 4,4'-bis-dimethylaminobenzhydrilbenzyl ether, N-halogen phenyl leucolamine, N-β-naphthyl leucolamine, N-2,4,5-trichlorophenyl leucolamine, N-2,4-dichlorophenyl leucolamine; xanthene compounds: rhodamine-β-anilinolactam, rhodamine-β-(p-nitroaniline)-lactam, rhodamine-β-(p-chloroaniline)-lactam, 7-dimethylamino-2-methoxy-fluorane, 7-diethylamino-3-methoxyfluorane, 7-diethylamino-3-methyl-fluorane, 7-diethylamino-3-chloro-fluorane, 7-diethylamino-3-chloro-2-methyl-fluorane, 7-diethylamino-2,4-dimethyl-fluorane, 7-diethylamino-2,3-dimethyl-fluorane, 7-diethylamino-(3-acetylmethylamino)-fluorane, 7-diethylamino-3-methylfluorane, 3,7-diethylamino-fluorane, 7-diethylamino-3-(dibenzylamino)-fluorane, 7-diethylamino-3-(methylbenzylamino)-fluorane, 7-diethylamino-3-(chloroethylmethylamino)-fluorane, 7-diethylamino-3-(dichloroethylamino)-fluorane, 7-diethylamino-3-(diethylamino)-fluorane; thiazine compounds: N-benzoyl leucomethylene blue, o-chlorobenzoyl leucomethylene blue, p-nitro-benzoyl leucomethylene blue; spiro compounds: 3-methyl-2,2'-spiro-bis-(benzo(f)-chromene).

It is also possible to encapsulate low-boiling liquids of the type suitable for use as blowing agents, such as methylene chloride, chloroform or "Frigen"; water-insoluble alcohols, water-insoluble catalysts, particularly those containing secondary or tertiary amino groups, water-insoluble, sluggishly reacting monoamines; water bound in water-insoluble hydrates of the type formed by numerous water-insoluble polyamines; finely divided solids dispersed in liquid or molten polyamine and/or solvents. Such solids may be water-insoluble minerals, metal oxides or metals, such as quartz, chalk, bauxite, iron oxides, nickel, copper, inorganic pigments, or other organic solids, such as active carbon or organic pigments. The polyamines used for forming the capsule walls may also be used as the material to be encapsulated. In this case, generally from 5 to 64%, by weight, preferably from 8 to 40%, by weight, of the polyamine is used for forming the capsule walls, the remainder being left as the capsule filling.

Before emulsification in the aqueous phase, the substances to be encapsulated are mixed with the polyamines in the conventional manner and then emulsified together in the aqueous phase.

The percentage of polyamine in the disperse phase before formation of the capsule walls generally amounts to from 1 to 95%, by weight, preferably from 3 to 50%, by weight, more preferably from 5 to 13%, by weight.

The polyisocyanate bisulphite adducts used are soluble in water, in other words they form a clear solution in water containing from 0.5 to 80 g, preferably from 20 to 40 g, of bisulphite adduct per 100 ml. The polyisocyanates are aliphatic or aromatic and contain at least two isocyanate groups.

Various known aliphatic and aromatic polyisocyantes may be used as the bisulphite adducts providing they are sufficiently soluble in water. In addition to the pure products, it is also possible to use mixtures of bisulphite adducts of various isocyanates and also bisulphite adducts of polyisocyanate mixtures. The polyisocyanates in the mixtures may contain varying numbers of isocyanate groups, bifunctional and trifunctional molecules being typical. While the bisulphite adducts of the aliphatic polyisocyanates are used in the form of aqueous solutions or powders, it is preferred in the case of bisulphite adducts of aromatic polyisocyanates to produce a powder which is dissolved in the slurry immediately before formation of the microcapsule. In general, it does not matter which cation of the bisulphite adduct is selected, sodium, potassium and ammonium ions being the norm. In borderline cases of solubility in water, the bisulphite adduct selected will be the adduct having the best solubility in water, generally the sodium salt.

Preferred water-soluble bisulphite adducts are the readily obtainable adducts of aliphatic polyisocyanates. They may be used in powder form or in the form of aqueous solutions.

Resplitting of the bisulphite adducts with aliphatic polyisocyanates only occurs to a significant extent at elevated temperatures. Capsule formation is considerably accelerated by heating the slurry to from 50° to 90° C. In general, stable microcapsules are formed in a sufficiently short time at such temperatures. For microencapsulation on an industrial scale, particularly in cases where it is carried out continuously, it is preferred to work under excess pressure at temperatures above 100° C. in order correspondingly to accelerate the encapsulation process. Water-soluble bisulphite adducts of aromatic polyisocyanates may also be used. Capsule formation takes place sufficiently quickly at temperatures as low as room temperature so that there is generally no need for a reaction at elevated temperatures. At very high temperatures, capsule formation may even be disrupted by agglomeration of the microcapsules or by the precipitation of polyurethane urea outside the capsule walls.

The adducts of the aromatic polyisocyanates do not have the same stability in water as those of the aliphatic polyisocyanates. At temperatures above room temperature, resplitting into disulphite and polyisocyanate very soon takes place as the temperature increases with corresponding conversion of the isocyanate groups by reaction with water to form polyurethane urea. Accordingly, such adducts are preferably added to the slurry in the form of a dry powder just before the reaction. Although there are distinct advantages with regard to the wall-forming temperature for microcapsules, the bisuiphite adducts of aromatic polyisocyanates are less preferred than those of aliphatic polyisocyanates. The reasons for this lie in the poorer safety of the process during microencapsulation and in the fact that this group of adducts is more difficult to produce on a commercial scale.

The following aromatic or aliphatic polyisocyanates which are soluble in water in the form of the bisulphite adducts thereof are mentioned by way of example:

Starting components are aliphatic cycloaliphatic, araliphatic, aromatic and heterocyclic polyisocyanates of the type described, for example, by W. Siefken in Justus Liebigs Annalen der Chemie, 562, pages 75 to 136, for example those corresponding to the following general formula:

$$Q(NCO)_n$$

wherein n=2–4, preferably 2; and

Q represents an aliphatic hydrocarbon radical containing from 2 to 18, preferably from 6 to 10, carbon atoms, a cycloaliphatic hydrocarbon radical containing from 4 to 15, preferably from 5 to 10, carbon atoms, an aromatic hydrocarbon radical containing from 6 to 15, preferably from 6 to 13, carbon atoms or an araliphatic hydrocarbon radical containing from 8 to 15, preferably from 8 to 13, carbon atoms, for example ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and -1,4-diisocyanate and mixtures of these isomers, 1-isocyanato-3,3,5-trimethyl-5-isocyanatomethyl cyclohexane (DE-AS No. 1,220,785, U.S. Pat. No. 3,401,190), 2,4- and 2,6-hexahydrotolylene diisocyanate and mixtures of these isomers, hexahydro-1,3- and/or -1,4-phenylene diisocyanate, perhydro-2,4'- and/or -4,4'-diphenylmethane diisocyanate, 1,3- and 1,4-phenylene diisocyanate, 2,4- and 2,6-tolylene diisocyanate and mixtures of these isomers, diphenylmethane -2,4'- and/or -4,4'-diisocyanate and naphthylene-1,5-diisocyanate.

According to the present invention, it is also possible to use, for example, triphenylmethane-4,4',4''-triisocyanate, polyphenyl-polymethylene polyisocyanates of the type obtained by phosgenating aniline/formaldehyde condensates and described, for example, in British Patent Nos. 874,430 and 848,671, m- and p-isocyanatophenyl sulphonyl isocyanates according to U.S. Pat. No. 3,454,606, perchlorinated aryl polyisocyanates of the type described, for example, in DE-AS No. 1,157,601 (U.S. Pat. No. 3,277,138), norbornane diisocyanates according to U.S. Pat. No. 3,492,330, polyisocyanates containing allophanate groups of the type described, for example, in British Patent No. 994,890, in Belgian Patent No. 761,626 and in NL Patent Application No. 71 02 524, polyisocyanates containing isocyanurate groups of the type described, for example, in U.S. Pat. No. 3,001,973, in German Patent Nos. 1,022,789; 1,222,067 and 1,027,394 and in DE-OS Nos. 1,929,034 and 2,004,048, polyisocyanates containing urethane groups of the type described, for example, in Belgian Patent No. 752,261 or in U.S. Pat. Nos. 3,394,164 and 3,644,457 polyisocyanates containing acylated urea groups according to German Patent No. 1,230,778, polyisocyanates containing biuret groups of the type described, for example in U.S. Pat. Nos. 3,124,605; 3,201,372 and 3,124,605 and in British Patent No. 889,050. Mixtures of the above-mentioned polyisocyanates may also be used.

Particularly preferred polyisocyanates are 1,6-hexamethylene diisocyanate, 1-isocyanato-3,3,5-trimethyl-5-isocyanatomethyl-cyclohexane, 2,4- and 2,6-tolylene diisocyanate, diphenyl-methane-2,4- and/or -4,4'-diisocyanate and also polyisocyanates containing urethane, allophanate, isocyanurate, urea or biuret groups and/or oxadiazine trione groups derived from the diisocyanates mentioned above.

Bisulphite adducts of aliphatic polyisocyanates are completely stable in water, but are converted into polyureas by reaction with primary amino groups. The reaction in question takes place at the interface between the outer aqueous phase and the disperse amine phase. The polyisocyanate is incorporated into the capsule wall at the interface by polymer formation while the bisulphite remains behind in the aqueous phase.

Bisulphite adducts of polyisocyanates, i.e. reaction products of sodium hydrogen sulphite with ailphatic and aromatic polyisocyanates are known and are described, for example, by S. Petersen in Liebig's Annalen der Chemie, Vol. 562 (1949), pages 205 et seq. The reaction thereof with amines in the aqueous phase to form polyureas is also known.

In spite of this, it was extremely surprising and unexpected to those skilled in the art to find that the described microencapsulation process could be carried out so easily. This is because those skilled in the art would have expected bisulphite adducts of polyisocyanates to react with water during resplitting in view of the very fine dispersion of the molecules in the aqueous solution and the amines formed to react further with other bisulphite adducts to form ureas. In the case of bisulphite adducts of aromatic polyisocyanates, this latter reaction is known as spontaneous resplitting at room temperature. In addition, those skilled in the art would have expected minimal solubility (a few ppm) of the polyamine in water to be sufficient to split the finely dispersed bisulphite adducts in the solution and, as a result, to cause polyurethane ureas to be formed by precipitation outside the capsule wall. This preconception was in fact initially confirmed in tests carried out using bisulphite adducts produced in the conventional way to the extent that capsules were not formed in the manner according to the present invention or, after initial formation, agglomerated in the slurry on stirring, causing the slurry to gel to a very considerable extent. In no case was it possible to isolate the capsules, for example by spray drying.

It was only when a powder-form bisulphite adduct which had been subjected to a particular purification process was used that it was realised that all the hitherto used aqueous solutions of the bisulphite adducts contained small quantities of emulsifier from the production process. Following removal of the emulsifier, it was possible to produce microcapsules in the manner according to the present invention even with aqueous solutions.

Solutions of bisulphite adducts may still contain bisulphites from the production process. It is preferred to convert these bisulphite residues into neutral salts before the beginning of the encapsulation process by the addition of appropriate quantities of neutralising substances, such as hydroxides, carbonates and/or bicarbonates.

The process by which the capsule wall is formed may be accelerated and promoted by other measures, for example by the addition of catalysts which promote resplitting of the bisulphite adducts, such as triethylene diamine and diethanolamine, or by conversion of the acid bisulphites newly formed into neutral salts by the addition of appropriate quantities of hydroxide, carbonates and/or bicarbonates.

This addition has to be gauged very carefully commensurate with the progress of formation of the capsule wall. If the addition is made all at once or in an excessive quantity, more polyisocyanate is easily released than may be directly reacted with the polyamine, resulting in more or less pronounced agglomeration.

If the resplitting catalyst, for example diethanolamine, is introduced into the oil phase before emulsification, it always acts in the vicinity of the interface on passing over from the disperse phase into the outer phase. Agglomeration may thus be avoided.

The encapsulation process according to the present invention and the microcapsules obtained have a number of advantages.

By virtue of its range of variation, the process according to the present invention frequently enables more favourable or cost-reducing parameters to be selected. Thus, where microencapsulation is carried out using high-melting polyamines, it may be advantageous to use a mixture of polyamines. In general, a polyamine which is liquid at room temperature dissolves solid higher-melting amines so that encapsulation may be carried out at a relatively low temperature. This has a particularly cost-reducing and technically simplifying effect, for example, when encapsulation under excess pressure may be avoided in this way.

The microcapsules produced by the described process are used in the form of a dispersion in water, although they may also be converted by spray-drying into powders. This may be done using conventional technical equipment and does not call for specialised measures. In addition to the solid constituents of the protective colloids, the powders obtained by spray drying also contain the bisulphites split off or salts formed therefrom by further reaction.

The quantity of salts formed may amount to as much as 20% of the dry matter, depending on the wall thickness adjusted. In general, the presence of the salts does not present problems. In certain cases, however, the salts have to be removed from the spray-dried product, i.e. the powder. Since the salt crystals which accumulate during spray drying are considerably smaller than the microcapsules, the removal thereof may readily be obtained in the course of the spray drying process, for example by correspondingly designing and arranging the cyclone and following tube filter.

The microcapsules according to the present invention may be used, for example, in the following fields:

As capsules containing dye-precursors for the production of reaction copying papers, as additives in the production of mouldings from resins, elastomers, foams, for example in the form of encapsulated flame-proofing agents, for example based on organic phosphorus or chlorine and bromine compounds, or blowing agents or in the form of encapsulated catalysts, particularly containing secondary or tertiary amino groups; as solvent capsules in the reactivation of adhesive layers; as dye- or pigment-containing capsules used in powder form as toners for copying systems; as active carbon-containing capsules for absorbing systems of all types, for example for incorporation in protective clothing or for dialysis systems.

In cases where the capsules contain only polyamines, they may be used as delayed-action cross-linkers for polyurethane systems.

The present invention is illustrated by the following Examples: All percentages and parts indicated are by weight.

Reverse Encapsulation

EXAMPLE 1

(a) Preparation of a protective colloid solution

A protective colloid solution is prepared from 1 part of polyvinyl alcohol (Mowiol 26/88, a product of Hoechst AG, Frankfurt), 2 parts of xanthan (Kelzan D, a product of the Kelco Division of Baltimore Aircoil/Chemviron SA) and 397 parts of distilled water by stirring at room temperature.

(b) Preparation of a colour-former solution 46 parts of benzoyl leucomethylene blue and 139 parts of crystal violet lactone are dissolved in 3932 parts of diisopropyl naphthalene by heating and stirring and 983 parts of isohexadecane are added to the resulting solution.

(c) Preparation of a colour-former solution 1 part of a green-developing fluorane derivative (Pergascript Olive IG, a product of Ciba-Geigy) is dissolved in 19 parts of diisopropyl diphenyl by stirring and heating to 80° C.

EXAMPLE 2

270 g of a protective colloid solution corresponding to Example 1(a) are introduced at room temperature into a glass beaker, followed by the addition with stirring (at 950 r.p.m. using a Kotthoff type MS 1 FCAB mixing siren, a product of the Kotthoff company of Rodenkirchen/Cologne) at room temperature of 55 g of the colour-former solution of Example 1(b) and 9.5 g of diethyl tolylene diamine. The rotational speed is then increased to 9000 r.p.m. for 45 seconds, resulting in the formation of a very fine oil-in-water emulsion. The rotational speed is reduced to 950 r.p.m. for 15 seconds, followed by the addition of 200 g of a clear solution (temperature 20° C.) of 180 g of protective colloid solution and 20 g of a powder-form sodium bisulphite adduct of hexamethylene diisocyanate.

After a second emulsification phase lasting 45 seconds with the mixing siren rotating at 9000 r.p.m., the slurry is transferred to a beaker equipped with a reflux condenser and laboratory stirrer and stirred at 200 r.p.m. for a total of 450 minutes while heating to 90° C.

An agglomerate-free slurry containing smooth, round and clearly transparent capsules ranging from 1 to 16 µm in diameter is obtained. Spray drying using a laboratory spray dryer (a Buchi 190 Mini Spray Dryer, a procut of the Buchi company of CH-9230 Flawil, Switzerland) gives a white, substantially agglomerate-free capsule powder. The capsules have diameters in the same range as the slurry and a liquid core.

EXAMPLE 2(a)

To produce a carbonless copying set, the slurry prepared in accordance with Example 2 is knife-coated in a layer thickness of 20 µm onto a sheet of typing paper. After the aqueous constituents of the slurry have dried in air at room temperature, a CB (coated back) sheet (donor sheet) is obtained and is placed with its coated back on the clay-coated front of a conventional commercial CF (coated front) sheet (receiving sheet).

When the top of the CB-sheet is written on with a ballpoint pen, the capsules of the CB-layer burst, releasing the colour-former solution, and the dissolved dye-precursor reacts in the CF-sheet to form a dark blue dye. A correspondingly dark blue coloured copy is obtained on the top of the receiving sheet.

EXAMPLE 3(a)

The procedure is as in Example 2. In addition, 15 g of a 30% NaOH solution are added 5 minutes after the beginning of the test.

Thereafter, capsule formation takes place very much more quickly than in Example 2 (i.e. in 10 minutes), but is accompanied by a marked tendency of the capsules to agglomerate. The test is terminated after a total of 60 minutes. The slurry obtained contains almost completely agglomerated capsules. Most of the agglomerates may be broken down into individual capsules. The individual capsules have diameters of from 1 to 15 µm and a wrinkled surface and are non-spherical and opaque.

EXAMPLE 3(b)

The procedure is as in Example 2. In addition, 5.6 g of $Na_2CO_3$ powder are added 5 minutes after the beginning of the test. Thereafter, capsule formation takes place in 15 minutes, accompanied by the formation of clusters of agglomerates having diameters of up to 60 µm. The test is terminated after a total of 60 minutes. The agglomerates may readily be non-destructively broken down into individual capsules on a specimen holder. The individual capsules have diameters of from 1 to 10 µm and are round, transparent and have smooth surfaces. High-quality coated-back copying paper may be produced by wet coating as in Example 2(a).

EXAMPLE 3(c)

The procedure is as in Example 2. In addition, 8.9 g of $NaHCO_3$ powder are added 5 minutes after the beginning of the test. Thereafter, capsule formation takes place in 10 minutes accompanied by the formation of relatively loose agglomerates up to 230 µm in diameter. The test is terminated after a total of 55 minutes. To break down the agglomerates, the slurry is returned to the mixing siren and stirred for 5 minutes at 3000 r.p.m. Thereafter, a substantially agglomerate-free slurry is obtained, containing round, transparent capsules having a smooth surface and diameters of from 1 to 14 µm.

High-quality CB-copying papers may be produced by wet coating as in Example 2(a).

EXAMPLE 3(d)

The procedure is as in Example 2. In addition, 15.8 g of triethanolamine are added 15 minutes after the beginning of the test. Thereafter, capsule formation takes place in 10 minutes accompanied by the formation of agglomerates up to 32 µm in diameter. The test is terminated after 85 minutes. To break down the agglomerates, the slurry is returned to the mixing siren and stirred at 3000 r.p.m. for 3 minutes. Thereafter, the slurry contains round, transparent capsules having a smooth surface and diameters of from 1 to 11 µm. Approxixmately 30% of the mainly relatively small capsules form agglomerates up to 18 µm in diameter.

High-quality CB-copying papers may be produced by wet coating in the same way as in Example 2(a).

Spray-drying gives a capsule powder containing approximately 50% of individual capsules from 1 to 11 µm in diameter and agglomerates up to 36 µm in diameter. Redispersion of the capsule powder in a 2% polyvinyl alcohol solution (Mowiol 26/88, a product of Hoechst AG, Frankfurt) gives a coating blend from which high quality CB copying papers may be produced by wet coating in the same way as in Example 2(a).

EXAMPLE 4

250 g of a protective colloid solution corresponding to Example 1(a) are introduced at room temperature into a glass beaker, followed by the addition with stirring (Kothoff mixing siren, 950 r.p.m.) of 114 g of a mixture of 100 g of the colour-former solution of Example 1(b) and 14 g of diethyl tolylene diamine. The rotational speed is then increased to 9000 r.p.m. for 45 seconds. A fine oil-in-water emulsion is formed. The rotational speed is reduced to 950 r.p.m. for 15 seconds and 153 g of a clear solution (20° C.) of 125 g of protective colloid solution, 25 g of powder-form sodium bisulphite adduct of biuretised hexamethylene diisocyanate and 3 g of powder-form sodium bisulphite adduct of hexamethylene diisocyanate are added. After a second emulsification phase lasting 45 seconds (with the mixing siren rotating at 9000 r.p.m.), the slurry is transferred to a laboratory stirrer and stirred for a total of 120 minutes at 700 r.p.m. accompanied by heating to 50° C.

An agglomerate-free slurry containing round, transparent capsules from 1 to 10 μm in diameter is obtained. High-quality CB-copying papers may be obtained by wet coating in the same way as in Example 2(a).

EXAMPLE 5

The procedure is as in Example 4 up to formation of the oil-in-water emulsion. After reduction of the rotational speed to 950 r.p.m., 155 g of a solution of 125 g of protective colloid solution and 30 g of powder-form sodium bisulphite adduct of biuretised hexamethylene diisocyanate are added. After another emulsification phase lasting 45 seconds (with the mixing siren rotating at 9000 r.p.m.), the slurry is transferred to a laboratory stirrer and stirred for a total of 300 minutes at 700 r.p.m. while heating to 70° C. An agglomerate-free slurry containing round, transparent capsules from 1 to 10 μm in diameter is formed. High-quality CB copying papers may be produced by wet coating in the same way as in Example 2(a).

EXAMPLE 6

250 g of a protective colloid solution corresponding to Example 1(a) are introduced into a glass beaker at 80° C., followed by the addition with stirring (Kotthoff mixing siren, 950 r.p.m.) of 113.5 g of a solution heated to 80° C. of 100 g of the colour-former solution of Example 1(b) and 13.5 g of diphenyl methane diamine. The rotational speed is then increased to 9000 r.p.m. for 45 seconds, resulting in the formation of an oil-in-water emulsion. The rotational speed is then reduced to 950 r.p.m. for 15 seconds and 144 g of a clear solution heated to 80° C. of 125 g of protective colloid solution and 19 g of powder-form sodium bisulphite adduct of hexamethylene diisocyanate are added. After a second emulsification phase lasting 45 seconds (with the mixing siren rotating at 9000 r.p.m.), the slurry is transferred to a laboratory stirrer and stirred for a total of 150 minutes at 80° C. An agglomerate-free slurry containing round, opaque capsules from 3 to 60 μm in diameter is obtained. A coating blend is prepared by mixing 1 part by wt. of slurry with 3 parts by wt. of a 2% polyvinyl alcohol solution (Mowiol 26/88, a product of Hoechst AG, Frankfurt). CB-copying papers may be produced as in Example 2(a) by wet coating using a 50 μm coating knife.

EXAMPLE 7

270 g of a protective colloid solution corresponding to Example 1(a) are introduced into a glass beaker at room temperature, followed by the addition with stirring (Kotthoff mixing siren, 950 r.p.m.) of 64.5 g of a mixture of 55 g of the colour-former solution of Example 1(c) and 9.5 g of diethyl tolylene diamine. The rotational speed is then increased to 9000 r.p.m. for 45 seconds, resulting in the formation of a very fine oil-in-water emulsion. The rotational speed is reduced to 950 r.p.m. for 15 seconds and 200 g of a clear solution at room temperature of 180 g of protective colloid solution and 20 g of powder-form sodium bisulphite adduct of hexamethylene diisocyanate are added. After a second emulsification phase lasting 45 seconds (with the mixing siren rotating at 9000 r.p.m.), the slurry is transferred to a three-necked flask equipped with a laboratory stirrer and reflux condenser and stirred for a total of 180 minutes while heating to 90° C. and then for another 120 minutes while cooling to room temperature.

An agglomerate-free slurry containing round, slightly opaque capsules ranging from 3 to 14 μm in diameter is obtained. High-quality CB copying papers may be produced by wet coating in the same way as in Example 2(a). A dark-green impression is obtained on the CF receiving paper. The copying properties of the paper were equally good after one month.

A capsule powder obtained by spray drying consists of round capsules having a wrinkled surface and diameters of from 3 to 11 μm. About half the capsules have agglomerated into clusters up to 18 μm in diameter.

Redispersion of the powder in a 2% polyvinyl alcohol solution (15 parts by wt. of powder to 85 parts by wt. of solution) gives a coating blend with which high quality CB copying papers leaving a dark green impression may be obtained by wet coating in the same way as in Example 2(a).

EXAMPLE 7(a)

15 minutes before the beginning of the test, a clear solution is prepared by mixing 88 parts by wt. of the colour-former solution of Example 1(c) and 22 parts by wt. of oxadiazine trione of hexamethylene diisocyanate at 80° C., followed by cooling to room temperature.

250 g of a protective colloid solution corresponding to Example 1(a) are introduced into a glass beaker at room temperature and 71 g of the clear solution prepared beforehand are added with stirring (Kotthoff mixing siren, 950 r.p.m.). After an emulsification time of 1 minute, the emulsion is transferred to a laboratory stirrer and stirred for a total of 180 minutes at 500 r.p.m. 2 minutes after the beginning of the test, a solution of 150 g of water and 26.4 g of diethylene triamine is added. Sufficiently stable capsules have formed after another 8 minutes so that, 10 minutes after the beginning of the test, some of the slurry may be knife-coated as in Example 2(a) onto a sheet of typing paper and dried without capsules being destroyed. A CB-paper is obtained which, when written on about 30 minutes after the beginning of the test, produces an olive-green impression on CF-receiving paper.

When the CB-paper is written on about 60 minutes after the beginning of the test, the impression obtained is barely visible. 180 minutes after the beginning of the test, the CB-copying paper has lost its copyability.

CB-papers produced with slurry removed 60 minutes and 120 minutes after the beginning of the test produced faint copies from the outset, leaving no impression whatever after 2 hours.

The slurry obtained at the end of the test is free from agglomerates. The capsules have a liquid filling, a wrinkled surface and diameters of from 2 to 28 μm.

EXAMPLE 8

270 g of a protective colloid solution corresponding to Example 1(a) are introduced into a glass beaker at room temperature, followed by the addition with stirring (Kotthoff mixing siren, 950 r.p.m.) of 64.5 g of a mixture of 55 g of DAB 7 paraffin oil (boiling range above 360° C.) and 9.5 g of diethyl tolylene diamine. The rotational speed is then increased to 9000 r.p.m. for 45 seconds, resulting in the formation of a fine oil-in-water emulsion. The rotational speed is reduced to 950 r.p.m. for 15 seconds and 200 g of a clear solution at room temperature of 180 g of protective colloid solution and 20 g of a powder-form sodium bisulphite adduct of hexamethylene diisocyanate are added. After a second emulsification phase lasting 45 seconds (with the mixing siren rotating at 9000 r.p.m.), the slurry is transferred to a three-necked flask equipped with a laboratory stirrer and reflux condenser and stirred for a total of 180 minutes while heating to 90° C. and then for another 120 minutes while cooling to room temperature. The slurry obtained contains capsules ranging from 3.5 to 31 μm in diameter and loose agglomerates of these capsules. The capsules may readily be converted into powder form by spray drying.

EXAMPLE 8(a)

To prepare an isocyanate-containing organic phase, 88 parts of DAB 7 paraffin oil (boiling range above 360° C.) and 22 parts of hexamethylene diisocyanate are stirred for 5 minutes (Kotthoff mixing siren, 9000 r.p.m.) at 80° C. and cooled to room temperature, resulting in the formation of a substantially unstable emulsion, rather than a solution, of the diisocyanate in the paraffin oil.

250 g of a protective colloid solution corresponding to Example 1(a) are introduced into a glass beaker at room temperature and 71 g of the organic emulsion prepared beforehand are added while stirring at 950 r.p.m. (mixing siren). After an emulsification time of 1 minute, the oil-in-water emulsion is transferred to a laboratory stirrer (500 r.p.m.). 2 minutes after the beginning of the test, a solution of 150 g of water and 64.4 g of diethylene triamine is added, resulting in the formation of a mixture of solid polyurethane urea beads and fragments in addition to nonencapsulated paraffin oil droplets. DAB 7 paraffin oil cannot be encapsulated in this way.

EXAMPLE 8(b)

The procedure is as in Example 8(a), except that, instead of hexamethylene diisocyanate, the oxadiazine trione of hexamethylene diisocyanate, is used and, accordingly, only 26.4 g of diethylene triamine are added. The result obtained is the same as in Example 8(a).

EXAMPLE 9

270 g of a protective colloid solution corresponding to Example 1(a) are introduced at room temperature into a glass beaker, followed by the addition with stirring (Kotthoff mixing siren, 950 r.p.m.) of 64.5 g of a mixture of 55 g of a partially hydrogenated terphenyl (Santosol 340, a product of the Monsanto Company) and isohexadecane in a ratio of 1:1 and 9.5 g of diethyl tolylene diamine. The rotational speed is then increased to 9000 r.p.m. for 45 seconds, resulting in the formation of a fine oil-in-water emulsion. The rotational speed is reduced to 950 r.p.m. for 15 seconds and 200 g of a clear solution at 20° C. of 180 g of protective colloid solution and 20 g of a powder-form sodium bisulphite adduct of hexamethylene diisocyanate are added. After a second emulsification phase lasting 45 seconds (with the mixing siren rotating at 9000 r.p.m.), the slurry is transferred to a three-necked flask equipped with a laboratory stirrer and reflux condenser and stirred for a total of 180 minutes while heating to 90° C. and then for another 120 minutes while cooling to room temperature. The slurry obtained contains round, transparent capsules ranging from 1.4 to 12 μm in diameter, approximately 30% of which form agglomerates up to 200 μm in size.

EXAMPLE 9(a)

To prepare an isocyanate-containing organic phase, 88 parts by wt. of a mixture of a partially hydrogenated terphenyl (Santosol 340, a product of the Monsanto Company) and isohexadecane in a ratio of 1:1 by wt. and 22 parts by wt. of the oxadiazine trione of hexamethylene diisocyanate are stirred for 5 minutes (Kotthoff mixing siren, 9000 r.p.m.) at 80° C., followed by cooling to room temperature. A substantially unstable emulsion, rather than a solution, of the diisocyanate in the solvent mixture is formed.

250 g of a protective colloid solution corresponding to Example 1(a) are introduced at room temperature into a glass beaker, followed by the addition with stirring (mixing siren, 950 r.p.m.) of 71 g of the emulsion prepared beforehand. After an emulsification time of 1 minute, the oil-in-water emulsion is transferred to a laboratory stirrer rotating at 500 r.p.m. 2 minutes after the beginning of the test, a solution of 150 g of water and 26.4 g of diethylene triamine is added, resulting in the formation of a mixture of solid polyurethane urea beads in addition to nonencapsulated solvent droplets and also relatively large, irregular agglomerates which also contain inclusions of solvent. Encapsulation of the solvent mixture of partially hydrogenated terphenyl and isohexadecane in a ratio of 1:1 by wt. is not possible by this process.

EXAMPLE 10

270 g of a protective colloid solution corresponding to Example 1(a) are introduced at room temperature into a glass beaker, followed by the addition with stirring (Kotthoff mixing siren, 950 r.p.m.) of 63.2 g of a mixture of 55 g of a partially hydrogenated terphenyl (Santosol 340, a product of the Monsanto company) and isohexadecane in a ratio of 1:1 by wt. and 8.2 g of diethyl tolylene diamine. Thereafter, the rotational speed is increased to 9000 r.p.m. for 45 seconds, resulting in the formation of an oil-in-water emulsion. The rotational speed is then reduced to 950 r.p.m. for 15 seconds, followed by the addition of 229.5 g of a clear solution (20° C.) of 180 g of protective colloid solution and 49.5 g of a 40% aqueous solution of the sodium bisulphite adduct of isophorone diisocyanate. After a second emulsification phase lasting 45 seconds (with the mixing siren rotating at 9000 r.p.m.), the slurry is transferred to a three-necked flask equipped with a laboratory stirrer and reflux condenser and stirred for a total of 180 minutes while heating to 90° C. and then for another 120 minutes while cooling to room temperature. The agglomerate-free slurry obtained contains capsules ranging widely in diameter from 1.4 to 150 μm. Some of the capsules are nonspherical and opaque, but all have a liquid core.

EXAMPLE 11

270 g of a protective colloid solution corresponding to Example 1(a) are introduced at room temperature into a glass beaker, followed by the addition with stirring (Kotthoff mixing siren, 950 r.p.m.) of 64.5 g of a mixture of 55 g of dodecyl benzene (Marlican S, a product of the Huls company, Marl) and 9.5 g of diethyl tolylene diamine. The rotational speed is then increased to 9000 r.p.m. for 45 seconds, resulting in the formation of a fine oil-in-water emulsion. The rotational speed is reduced to 950 r.p.m. for 15 seconds, followed by the addition of 200 g of a clear solution (20° C.) of 180 g of protective colloid solution and 20 g of a powder-form sodium bisulphite adduct of hexamethylene diisocyanate. After a second emulsification phase lasting 45 seconds (with the mixing siren rotating at 9000 r.p.m.), the slurry is transferred to a three-necked flask equipped with a laboratory stirrer and reflux condenser and stirred for a total of 180 minutes while heating to 90° C. and then for another 120 minutes while cooling to room temperature. The slurry obtained contains round, transparent capsules ranging from 1 to 7 μm in diameter. Approximately 30% of the capsules form agglomerates up to 230 μm in size.

EXAMPLE 11(a)

To prepare an isocyanate-containing organic phase, 88 parts of dodecyl benzene and 22 parts by wt. of the oxadiazine trione of hexamethylene diisocyanate are stirred for 5 minutes (Kotthoff mixing siren, 9000 r.p.m.) at 80° C., followed by cooling to room temperature. A substantially unstable emulsion, rather than a solution, of the diisocyanate in the solvent is formed.

250 g of a protective colloid solution corresponding to Example 1(a) are introduced at room temperature into a glass beaker, followed by the addition with stirring (mixing siren, 950 r.p.m.) of 71 g of the organic emulsion prepared beforehand. After an emulsification time of 1 minute, the oil-in-water emulsion is transferred to a laboratory stirrer rotating at 500 r.p.m. 2 minutes after the beginning of the test, a solution of 150 g of water and 26.4 g of diethylene triamine is added, resulting in the formation of a mixture of solid polyurethane urea beads and fragments, some of which have clustered together to form relatively large agglomerates, in addition to non-encapsulated solvent droplets. Dodecyl benzene cannot be encapsulated by this process.

EXAMPLE 12

125 g of a protective colloid solution corresponding to Example 1(a) are introduced at room temperature into a glass beaker, followed by the addition with stirring (Kotthoff mixing siren, 950 r.p.m.) of 15.4 g of a clear solution of 13.2 g of the colour-former solution of Example 1(c) and 2.2 g of diethyl tolylene diamine. The rotational speed is then increased to 9000 r.p.m. for 45 seconds, resulting in the formation of an oil-in-water emulsion. The rotational speed is reduced to 950 r.p.m. for 30 seconds, followed by the addition of 100 g of a clear solution, prepared at room temperature about 15 minutes before the beginning of the test, of 90 g of protective colloid solution and 10 g of a powder-form sodium bisulphite adduct of an isomer mixture of tolylene diisocyanate (80% of 2,4-TDI and 20% of 2,6-TDI). After a second emulsification phase lasting 60 seconds (with the mixing siren rotating at 9000 r.p.m.), the slurry is transferred to a laboratory stirrer and stirred for a total of 180 minutes at 700 r.p.m. while heating to 50° C. An agglomerate-free slurry is obtained which contains transparent capsules having a wrinkled surface and diameters of from 1 to 15 μm.

High-quality CB-copying papers may be produced as in Example 2(a) by wet coating using a 40 μm coating knife. A dark-green impression is obtained on the CF-receiving paper. Copyability was still as good after 1 month.

EXAMPLE 12(a)

15 minutes before the beginning of the test, a clear solution is prepared by mixing 81 parts by wt. of the colour-former solution of Example 1(c) and 19 parts by wt. of an isomer mixture of tolylene diisocyanate (80% of 2,4-TDI and 20% of 2,6-TDI) at 80° C. and cooling the resulting mixture to room temperature. 135 g of a protective colloid solution corresponding to Example 1(a) are introduced at room temperature into a glass beaker, followed by the addition with stirring (Kotthoff mixing siren, 950 r.p.m.) of 34.1 g of the solution prepared beforehand. The rotational speed is increased to 9000 r.p.m. and, after an emulsification time of 45 seconds, the emulsion is transferred to a laboratory stirrer rotating at 500 r.p.m. 30 seconds later, a clear solution of 87 g of water and 13 g of diethylene triamine is added, followed by stirring for a total of 120 minutes. An agglomerate-free slurry is obtained, containing transparent capsules having a wrinkled surface and diameters of from 1 to 14 μm.

When written on, a CB-paper, produced by wet coating as in Example 2(a), produces a red impression on a CF-receiving paper. The colour-former has clearly undergone a significant chemical change as a result of reaction with the diisocyanate. 24 hours after preparation of the slurry, the capsules have lost their copying power both on the CB-paper prepared and in the slurry itself.

EXAMPLE 13

270 g of a protective colloid solution corresponding to Example 1(a) are introduced at 70° C. into a glass beaker, followed by the addition with stirring (laboratory stirrer, 500 r.p.m.) of 71 g of a mixture of 11 g of diethanolamine, 30 g of Marlican S and 30 g of diethyl tolylene diamine. A very fine oil-in-water emulsion is formed. 25 seconds after addition of the amine mixture, 200 g of a clear solution heated to 70° C. of 180 g of protective colloid solution and 20 g of a powder-form bisulphite adduct of hexamethylene diisocyanate are added.

Formation of the capsule wall takes place very quickly, i.e. in as little as 10 minutes. This is reflected in thickening of the slurry. The slurry is stirred for a total of 40 minutes at an increased rotational speed of 700 r.p.m. and at a temperature of 70° C. An agglomerate-free slurry is formed, containing spherical opaque capsules having a rough wrinkled surface and ranging from 1 to 11 μm in diameter. The capsules contain a mixture of solvent and amines.

EXAMPLE 14

A protective colloid solution is prepared by stirring 5 parts by wt. of polyvinyl alcohol (Mowiol 26/88, a product of Hoechst AG, Frankfurt), 10 parts by wt. of xanthan (Kelzan D, a product of the Kelco Division of Baltimore Aircoil/Chemviron SA) and 1985 parts by wt. of distilled water at room temperature.

270 g of the protective colloid solution are introduced at 70° C. into a glass beaker, followed by the addition with stirring at 500 r.p.m. (laboratory stirrer, 6 blades, 3 cm long, 1 cm wide) of 30 g of diethyl tolylene diamine. A fine oil-in-water emulsion is formed.

30 seconds after addition of the diamine, 200 g of a clear solution heated to 70° C. of 180 g of protective colloid solution and 20 g of a powder-form potassium bisulphite adduct of hexamethylene diisocyanate are added. The rotational speed is then increased to 700 r.p.m., followed by stirring for a total of 70 minutes at 70° C. Thereafter, spherical, smooth transparent capsules ranging from 3 to 18 μm in diameter have formed. The slurry is completely free from agglomerates.

After cooling to room temperature, the slurry is dried in the conventional way in a laboratory spray dryer (a Mini Spray Dryer as manufactured by the Buchi company of CH-9230 Flawil, Switzerland). A finely divided, agglomerate-free pale yellow capsule powder is obtained. The capsules have the same diameter distribution as in the slurry, are spherical, but now have a rough surface and are opaque.

EXAMPLE 15

The procedure is initially as in Example 14 up to addition of the diethyl tolylene diamine.

30 seconds after addition of the diamine, 122.5 g of a clear solution heated to 70° C. of 180 g of protective colloid solution and 12.5 g of powder-form sodium bisulphite adduct of the biuretised hexamethylene diisocyanate are added. The rotational speed is then increased to 700 r.p.m., followed by stirring for a total of 70 minutes at 70° C. Spherical, opaque capsules having a rough surface and diameters of from 4 to 28 μm are formed. Spray drying under the same conditions as in Example 14 gives a fine free-flowing capsule powder containing some agglomerated capsules.

EXAMPLE 16

A fine emulsion of diethyl tolylene diamine in protective colloid solution is prepared in the same way as in Example 14. 30 seconds after addition of the diamine, 200 g of a clear solution of 180 g of protective colloid solution and 20 g of powder-form sodium bisulphite adduct of hexamethylene diisocyanate are added.

The rotational speed is then increased to 700 r.p.m. and maintained for a total of 70 minutes.

An agglomerate-free slurry is obtained, containing spherical, smooth transparent capsules ranging from 5 to 18 μm in diameter. The slurry may be spray dried in the same way as in Example 14, resulting in the formation of a very fine, slightly agglomerated capsule powder.

EXAMPLE 17

A fine oil-in-water emulsion of diethyl tolylene diamine in protective colloid solution is prepared in the same way as in Example 14. 30 seconds after addition of the diamine, 247.5 g of a clear solution heated to 65° C. of 180 g of protective colloid solution and 67.5 g of a 40% aqueous solution of the sodium bisulphite adduct of the trimer of hexamethylene diisocyanate (calculated masked NCO-content 7.8%) are added. The rotational speed is then increased to 700 r.p.m., the temperature increased to 70° C. and the emulsion stirred for a total of 70 minutes.

An agglomerate-free non-sedimenting slurry is formed, containing round capsules having a rough surface and ranging from 2.5 to 20 μm in diameter.

EXAMPLE 18

810 g of a protective colloid solution of the type used in Example 14 are introduced at 70° C. into a glass beaker, followed by the addition with stirring at 700 r.p.m. (laboratory stirrer, 6 blades, 3 m long and 1 cm wide) of 90 g of diethyl tolylene diamine. A fine oil-in-water emulsion is formed. 1 minute after addition of the diamine, 707 g of a clear solution heated to 65° C. of 540 g of protective colloid solution and 167 g of a 40% aqueous solution of the sodium bisulphite adduct of isophorone diisocyanate are added. After 3 minutes, the glass beaker is transferred to a Kotthoff mixing siren (type DE 032 S) and emulsified for 2 minutes at 5320 r.p.m. The emulsion is then stirred for another 65 minutes at 700 r.p.m. (same laboratory stirrer) accompanied by heating to 70° C. An agglomerate-free non-sedimenting slurry is obtained, containing spherical transparent capsules having a smooth surface and ranging from 1 to 17 μm in diameter.

An agglomerate-free capsule powder may be produced by spray drying. The capsules of the powder are spherical, opaque and have a wrinkled surface.

EXAMPLE 19

25 parts by weight of biuretised hexamethylene diisocyanate (Desmodur®N, a product of Bayer AG) are mixed with 28 parts by weight of the capsules of Example 5 to form a paste which is then heated to 120° C. over a period of 10 minutes. The mass begins to solidify at temperatures above 70° C. and, on reaching 120° C., is brittle and hard.

A sample of the same polyisocyanate without capsules heated in the same way remains liquid.

A hermetically sealed sample of the above-described polyisocyanate-capsule mixture retains its paste-like consistency for at least 8 days at room temperature.

EXAMPLE 20

100 parts by weight of a chlorobenzene solution containing 25% of biuretised hexamethylene diisocyanate are mixed with 28 parts by weight of capsules of Example 5 and the resulting mixture heated to 120° C. over a period of 10 minutes, during which the mass hardens to form an impact-resistant solid.

A hermetically sealed comparison sample of the above-described mixture remains liquid for at least 8 days at room temperature.

EXAMPLE 21

A fine emulsion of diethyl tolylene diamine in protective colloid solution is prepared in the same way as in Example 14.

30 seconds after addition of the diamine, 245 g of a clear solution heated to 65° C. of 180 g of protective colloid solution and 65 g of a 40% aqueous solution of the sodium bisulphite adduct of a mixture of 41 parts of isophorone diisocyanate and 59 parts of biuretised hexamethylene diisocyanate are added. The rotational speed is then increased to 700 r.p.m., the temperature increased to 70° C. and the emulsion stirred for a total of 70 minutes. An agglomerate-free non-sedimenting slurry is obtained. The capsules are spherical, have a smooth surface, are partly opaque and have diameters of from 1.5 to 15 μm.

EXAMPLE 22

A fine emulsion of diethyl tolylene diamine in protective colloid solution is prepared in the same way as in Example 18. 1 minute after addition of the diamine, 617 g of a clear solution heated to 65° C. of 540 g of protective colloid solution, 30 g of powder-form sodium bisulphite adduct of hexamethylene diisocyanate and 47 g of a 40% aqueous solution of the sodium bisulphite adduct of biuretised hexamethylene diisocyanate are added. After 3 minutes, the glass beaker was transferred to a Kotthoff mixing siren (type De 032 S) and emulsified for 2 minutes at 5320 r.p.m. The emulsion was then stirred for another 65 minutes at 700 r.p.m. (using the same laboratory stirrer) accompanied by heating to 70° C.

An agglomerate-free, non-sedimenting slurry containing capsules ranging from 1 to 16 μm in diameter is obtained. The capsules are predominantly smooth, transparent and spherical, the larger capsules are irregular in shape, opaque and have a wrinkled surface.

A spray-dried capsule powder shows good free-flow properties and contains liquid-filled capsules which are irregular in shape, opaque and have a wrinkled surface, and also agglomerates up to 75 μm in size.

EXAMPLE 23

15 minutes before the reaction, a clear solution of 25 parts by weight of the protective colloid solution used in Example 14 is prepared at room temperature (approx. 23° C.) by the addition with stirring for 5 minutes of 3 parts by weight of a powder-form sodium bisulphite adduct of an isomer mixture of tolylene diisocyanate (80% of 2,4-TDI and 20% of 2,6-TDI).

135 g of the previously used protective colloid solution are introduced at room temperature into a glass beaker, followed by the addition with stirring at 500 r.p.m. (laboratory stirrer) of 15 g of diethyl tolylene diamine. A fine oil-in-water emulsion is formed.

30 seconds after addition of the diamine, 100.0 g of the previously prepared solution of the bisulphite adduct are added. The rotational speed is then increased to 700 r.p.m. and maintained for a total of 70 minutes. Throughout the duration of the test, emulsions and slurry remain at room temperature.

An agglomerate-free slurry is formed. The capsules are spherical and transparent with a slightly wrinkled surface and have diameters of from 1 to 10 μm.

A capsule powder with slight local agglomerations may be produced by spray drying. The capsules are now opaque with a much more wrinkled surface and have a liquid core.

EXAMPLE 24

270 g of the protective colloid solution corresponding to Example 1(a) are introduced at 80° C. into a glass beaker, followed by the addition with stirring at 700 r.p.m. (laboratory stirrer) of 20 g of a liquid diamine mixture of 10.5 g of 4,4'-diaminodiphenyl-methane and 9.5 g of diethyl tolylene diamine heated to 80° C.

25 seconds after addition of the diamine mixture, 200 g of a clear solution heated to 80° C. of 180 g of protective colloid solution and 20 g of a powder-form sodium bisulphite adduct of hexamethylene diisocyanate are added.

The mixture is stirred for a total of 70 minutes at 700 r.p.m. and at 80° C.

After cooling to room temperature, a slurry is obtained in which approximately 10% of the capsules have formed agglomerates up to 35 μm in size. The individual capsules appear partly clear and partly opaque with a wrinkled to furrowed surface and have a solid core.

EXAMPLE 25

135 g of a protective colloid solution corresponding to Example 1(a) are introduced at 70° C. into a glass beaker, followed by the addition with stirring at 500 r.p.m. (laboratory stirrer) of 15 g of diaminomethylated-cyclododecane which is liquid at room temperature. A very fine oil-in-water emulsion is formed.

25 seconds after addition of the diamine, 112.5 g of a clear solution heated to 70° C. of 90 g of protective colloid solution and 22.5 g of a 40% aqueous solution of the sodium bisulphite adduct of isophorone diisocyanate are added.

The slurry is stirred for a total of 70 minutes at 500 r.p.m. and at 70° C. The slurry formed contains very small capsules ranging from 1 to 3 μm in diameter which have largely agglomerated into small clusters less than 10 μm in diameter.

EXAMPLE 26

270 g of a protective colloid solution of the type described in Example 1(a) are introduced at 75° C. into a glass beaker, followed by the addition with stirring at 500 r.p.m. (laboratory stirrer) of 30 g of diphenylmethane-3,3'-dithiomethyl-4,4'-diamine which is liquid at 75° C.

25 seconds after addition of the diamine, 115 g of a clear solution heated to 75° C. of 180 g of protective colloid solution and 15 g of a powder-form sodium bisulphite adduct of hexamethylene diisocyanate are added. The rotational speed is increased to 700 r.p.m. and is maintained for a total of 120 minutes at a temperature of 75° C. An agglomerate-free slurry containing polyamine-filled microcapsules ranging from 1 to 12 μm in diameter is formed.

EXAMPLE 27

135 g of a protective colloid solution of the type described in Example 1(a) are introduced at 70° C. into a glass beaker, followed by the addition with stirring at 500 r.p.m. (laboratory stirrer) of 15 g of a polyamine, liquid at room temperature, produced from a prepolymer containing 14.3% of NCO-groups of hexamethylene diisocyanate and dipropylene glycol by conversion of the terminal NCO-groups by hydrolysis into amino groups (6-amino-n-hexylcarbamic acid dipropylene glycol diester). A coarse oil-in-water emulsion is formed.

25 seconds after addition of the diamine, 102.5 g of a clear solution heated to 70° C. of 90 g of protective colloid solution and 12.5 g of a 40% aqueous solution of the sodium bisulphite adduct of isophorone diisocyanate are added.

The slurry is stirred at 500 r.p.m. for a total of 70 minutes at a temperature of 70° C.

The slurry formed contains predominantly lemon-shaped capsules having a spherical core, as known from the production of microcapsules by complex coacervation. The capsules range from 9 to 230 μm in diameter.

EXAMPLE 28

270 g of a protective colloid solution of the type described in Example 1(a) are introduced at 98° C. into a glass beaker, followed by the addition with stirring at 500 r.p.m. (laboratory stirrer) of 30 g of a polyamine mixture heated to 98° C. of diphenylmethane-3,5-diethyl-3',5'-diisopropyl-4,4'-diamine, diphenylmethane-3,3',5,5'-tetraisopropyl-4,4'-diamine and diphenylmethane-3,3',5,5'-tetraethyl-4,4'-diamine.

25 seconds after addition of the diamine, 193 g of a clear solution heated to 98° C. of 180 g of protective colloid solution and 13 g of a powder-form sodium bisulphite adduct of hexamethylene diisocyanate are added. The rotational speed is increased to 700 r.p.m. for 1 minute, after which the slurry is transferred to a 1 litre three-necked flask equipped with a reflux condenser, in which the slurry is refluxed and stirred (300 r.p.m.) for 4.5 h. The slurry formed contains polyamine-filled microcapsules ranging from 1 to 13 μm in diameter. Approximately 5% of the capsules have clustered together to form agglomerates up to 24 μm in diameter.

EXAMPLE 29

10 g of the capsule powder obtained in accordance with Example 14 are intensively mixed with 190 g of a trimethylol propane-started polyether (OH-number 35) containing more than 80% of primary OH-groups. The dispersion formed is then thoroughly mixed with 6 g of H$_2$O, 2 g of diethanolamine, 0.5 g of diazabicyclooctane, 4 g of tris-2-chloroethyl phosphate and 0.25 g of tin(II)dioctoate. After thorough mixing, 77.4 g of tolylene diisocyanate (isomer mixture: 80% of 2,4- and 20% of 2,6-tolylene diisocyanate) are added with rapid stirring and the foamable mixture poured into an open mould. After a rise time of 83 seconds, an open-cell flexible foam is obtained. The foam is then after-treated for 1 hour at 120° C. in a drying cabinet. A highly elastic, flexible foam having favourable mechanical properties is obtained.

We claim:

1. A process for the production of a microcapsule having a hydrophobic core material and a capsule wall formed from the reaction of a polyisocyanate adduct and a polyamine, said process comprising emulsifying in water or in an aqueous protective colloid solution a mixture of a hydrophobic core material and a water-insoluble polyamine, adding a water-soluble polyisocyanate bisulphite adduct in the form of powder or an aqueous solution and allowing the mixture to react to completion at a temperature of from 1° to 140° C.

2. A process as claimed in claim 1 wherein the water-insoluble constituents of the emulsion comprise from 0.5 to 50%, by weight, thereof.

3. A process as claimed in claims 1 and 2 wherein the hydrophobic core material comprises a dye-precursor.

4. A process as claimed in claim 3 wherein the dye-precursor is selected from 3,3-bis-(p-dimethylaminophenyl)phtalide, 4,4'-bis-dimethylaminobenzhydrilbenzl ether, N-halogen phenyl leucolamine, N-β-naphthyl leucolamine, N-2,4,5-trichlorophenyl leucolamine, N-2,4-dichlorophenyl leucolamine, rhodamine-β-anilinolactam, rhodamine-β-(p-nitroaniline)-lactam, rhodamine-β-(p-chloroaniline)-lactam, 7-dimethylamino-2-methoxy-fluorane, 7-diethylamino-3-methoxyfluorane, 7-diethylamino-3-methyl-fluorane, 7-diethylamino-3-chloro-fluorane, 7-diethylamino-3-chloro-2-methyl-fluorane, 7-diethylamino-2,4-dimethyl-fluorane, 7-diethylamino-2,3-dimethyl-fluorane, 7-diethylamino-(3-acetylmethylamino)-fluorane, 7-diethylamino-3-methyl-fluorane, 3,7-diethylamino-fluorane, 7-diethylamino-3-(dibenzylamino)-fluorane, 7-diethylamino-3-(methyl-benzylamino)-fluorane, 7-diethylamino-3-(chloroethylmethylamino)-fluorane, 7-diethylamino-3-(dichloroethylamino)-fluorane, 3,3-bis-(p-dimethylaminophenyl)-6-dimethylaminophthalide, 7-diethyl-amino-3-(diethylamino)-fluorane, N-benzoyl leucomethylene blue, o-chlorobenzoyl leucomethylene blue, p-nitrobenzoyl leucomethylene blue and 3-methyl-2,2'-spiro-bis-(benzo(f)-chromene).

* * * * *